(12) United States Patent
Head et al.

(10) Patent No.: US 10,340,777 B2
(45) Date of Patent: Jul. 2, 2019

(54) LINE START PERMANENT MAGNET MOTOR

(71) Applicant: COREteQ Systems Ltd., Bagshot (GB)

(72) Inventors: Philip Head, Virginia Water (GB); Hassan Mansir, Maidenhead (GB)

(73) Assignee: COREteQ Systems Ltd., Bagshot (GB)

( * ) Notice: Subject to any disclaimer, the term of this patent is extended or adjusted under 35 U.S.C. 154(b) by 143 days.

(21) Appl. No.: 15/036,159

(22) PCT Filed: Nov. 17, 2014

(86) PCT No.: PCT/EP2014/074808
§ 371 (c)(1),
(2) Date: May 12, 2016

(87) PCT Pub. No.: WO2015/071470
PCT Pub. Date: May 21, 2015

(65) Prior Publication Data
US 2016/0294265 A1    Oct. 6, 2016

(30) Foreign Application Priority Data
Nov. 15, 2013    (GB) .................................. 1320248.6

(51) Int. Cl.
*H02K 17/34* (2006.01)
*E21B 43/12* (2006.01)
*H02K 5/132* (2006.01)
*H02K 21/00* (2006.01)

(52) U.S. Cl.
CPC ........... *H02K 17/34* (2013.01); *E21B 43/128* (2013.01); *H02K 5/132* (2013.01); *H02K 21/00* (2013.01)

(58) Field of Classification Search
CPC ........ H02K 21/46; H02K 1/276; H02K 7/003; H02K 17/165
See application file for complete search history.

(56) References Cited

U.S. PATENT DOCUMENTS

| | | | |
|---|---|---|---|
| 1,469,304 A | 10/1923 | Hughes | |
| 1,960,484 A | 5/1934 | Ekstromer | |
| 2,240,569 A | 5/1941 | Myers | |

(Continued)

FOREIGN PATENT DOCUMENTS

| | | |
|---|---|---|
| CN | 101227127 A1 | 7/2008 |
| CN | 101873043 A | 10/2010 |

(Continued)

OTHER PUBLICATIONS

G2 Consult: "Theory & Practice of Electromagnetic Design of DC Motors & Actuators", Internet, Nov. 16, 2012, retrieved from the Internet Jan. 22, 2016: URL: https://web.archive.org/web/20120116070129/http://www.consult-g2.com/course/chapter8/chapter.html ; 5 pgs.

(Continued)

*Primary Examiner* — Dang D Le
(74) *Attorney, Agent, or Firm* — Fay Sharpe LLP

(57) ABSTRACT

A downhole electric submersible pump, with at least one pump unit having a pump inlet, and an electric motor system to power the pump, the electric motor system comprising an induction motor and permanent magnet motor. The induction motor and permanent magnet motor share a common power supply, connected in series.

6 Claims, 3 Drawing Sheets

(56) References Cited

U.S. PATENT DOCUMENTS

Figure 1:
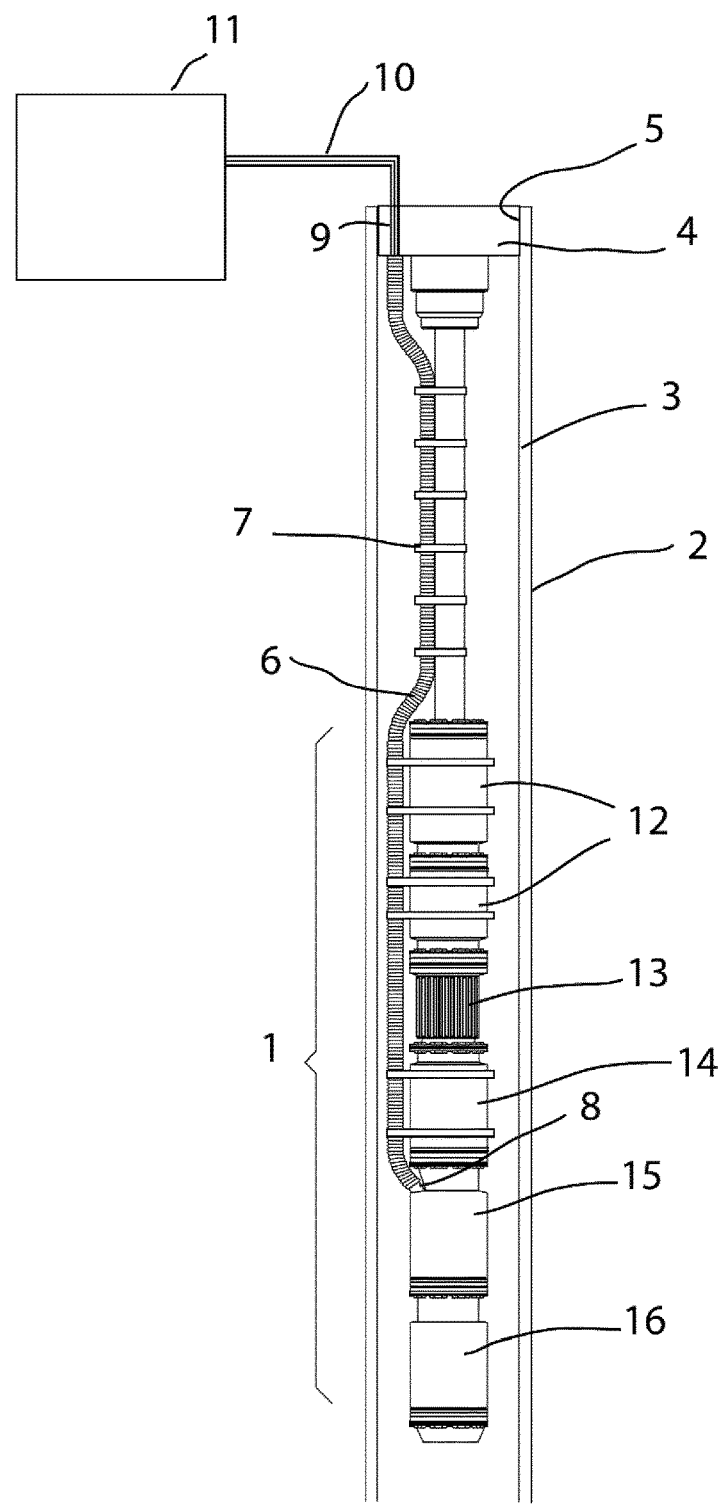

| | | | |
|---|---|---|---|
| 5,682,074 A | 10/1997 | Di Pietro et al. | |
| 6,388,353 B1* | 5/2002 | Liu | F04B 13/00 |
| | | | 310/114 |
| 2002/0066568 A1 | 6/2002 | Buchanan | |
| 2002/0079763 A1 | 6/2002 | Fleshman et al. | |
| 2009/0184598 A1 | 7/2009 | Nakano | |
| 2011/0316468 A1 | 12/2011 | Makki et al. | |
| 2015/0110642 A1* | 4/2015 | Dahouk | F04D 13/068 |
| | | | 417/16 |

FOREIGN PATENT DOCUMENTS

| | | |
|---|---|---|
| DE | 102011120985 A1 | 6/2013 |
| EP | 2112748 A1 | 10/2009 |
| EP | 2573908 A2 | 3/2013 |
| GB | 2438493 A | 11/2007 |
| GB | 2501352 A | 10/2013 |
| JP | S57186966 A | 11/1982 |
| JP | H05 22916 A | 1/1993 |
| JP | H11 299144 A | 10/1999 |
| JP | 2009095193 A | 4/2009 |
| WO | WO2004027211 A1 | 4/2004 |
| WO | WO2015/071468 A3 | 5/2015 |
| WO | WO2015071465 A1 | 5/2015 |
| WO | WO2015071466 A2 | 5/2015 |
| WO | WO2015071469 A2 | 5/2015 |

OTHER PUBLICATIONS

International Search Report and Written Opinion, PCT/EP2014/074808, dated Feb. 10, 2015, Mailed Feb. 19, 2015, 10 pages.

* cited by examiner

LINE START PERMANENT MAGNET MOTOR

CROSS-REFERENCE TO RELATED APPLICATIONS

This application is a National Stage Entry of PCT/EP2014/074808, and claims priority to, and the benefit of, Great Britain Patent Application No. GB 1320248.6, filed Nov. 15, 2013, the entirety of which is hereby incorporated by reference as if fully set forth herein.

TECHNICAL FIELD

This invention relates to electric motors, and more particularly, to a permanent magnet motor and induction motor combination that is capable of self-starting when operated directly on line.

BACKGROUND ART

Permanent magnet motors are typically unable to operate without elaborate controls because they cannot be started when connected directly to the line. Thus, they typically employ rotor position transducers and control electronics in order to start. These components quite clearly add to both the cost and the complexity of the motor system, also in a wellbore environment they are more susceptible to damage and have to communicate with the controlled over a very long cable, which is both expensive because of the long cable but also introduces some time delays due to the many thousands of feet between the motor controlled and the motor.

It is therefore the objective of this invention to provide a wellbore motor system that is easy to control in a wellbore environment.

According to the present invention, there is provided a downhole electric submersible pump, comprising at least one pump unit having a pump inlet, and an electric motor system to power the pump, the electric motor system comprising an induction motor and permanent magnet motor.

The use of an induction motor coupled in series with a permanent magnet motor to start the system on line, or with a simple drive avoids the necessity of position transducers and control electronics, while providing for a direct on-line starting performance, a small induction motor can be connected in series with the permanent magnet motor and act as a starter motor for the main permanent magnet motor.

The benefit of this combination is that the induction motor is able to get the rotor turning in the correct direction and once the permanent magnet rotor is in synchronisation no power is absorbed by the induction motor and all the efficiency benefits of the permanent magnet motor are realised.

These motors can then be run at synchronous speed, and the efficiency of the permanent magnet motor allows a significant energy saving over an equivalent induction motor.

Ideally, the motors have the same number of poles. The electric circuits of both motors are in series and terminated with a single star point.

The induction motor is used to start a permanent magnet motor. The permanent magnet motor once at speed will operate synchronous with the supply frequency. Once at synchronous speed the induction motor will generate zero torque and consume minimum power. If the permanent magnet motor losses synchronisation, the induction motor will generate torque and enable the system to regain synchronisation.

The motors can be run on direct line, and the motors can be in series electrically and mechanically.

By connecting the induction motor in series with a permanent magnet motor, one can start the system on line, or with a simple drive; the induction motor is able to get the rotor turning in the correct direction and once the permanent magnet rotor is in synchronisation no power is absorbed by the induction motor and all the efficiency benefits of the permanent magnet motor are realised.

By way of example the following figures will be used to describe embodiments of the invention.

FIG. 1 is a section side view of a well, showing the general equipment arrangement from surface to downhole.

Figure 2:
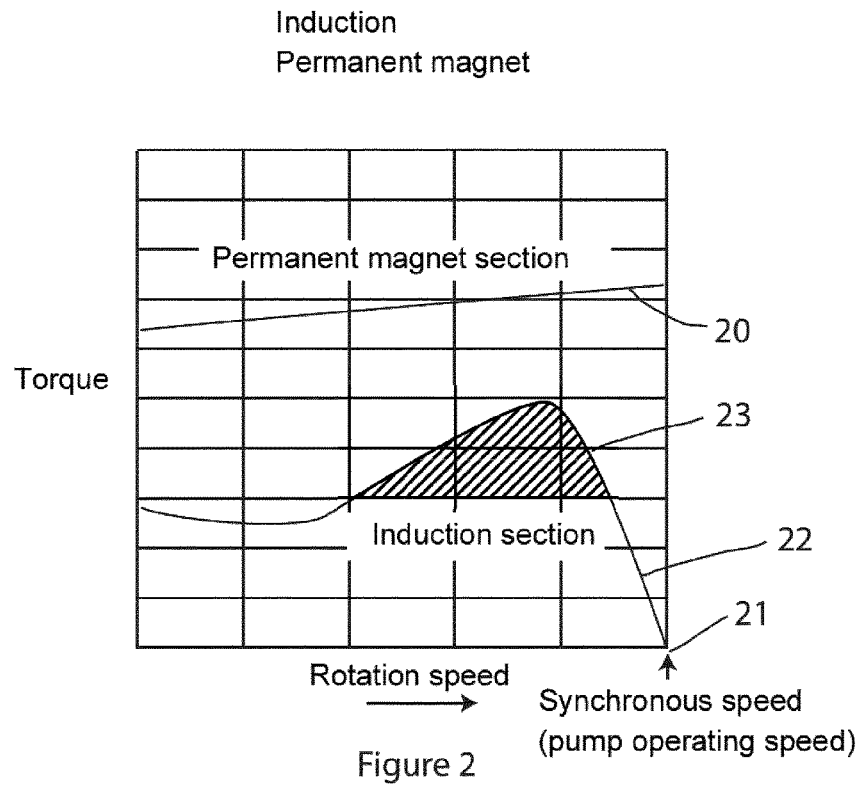
Figure 3:
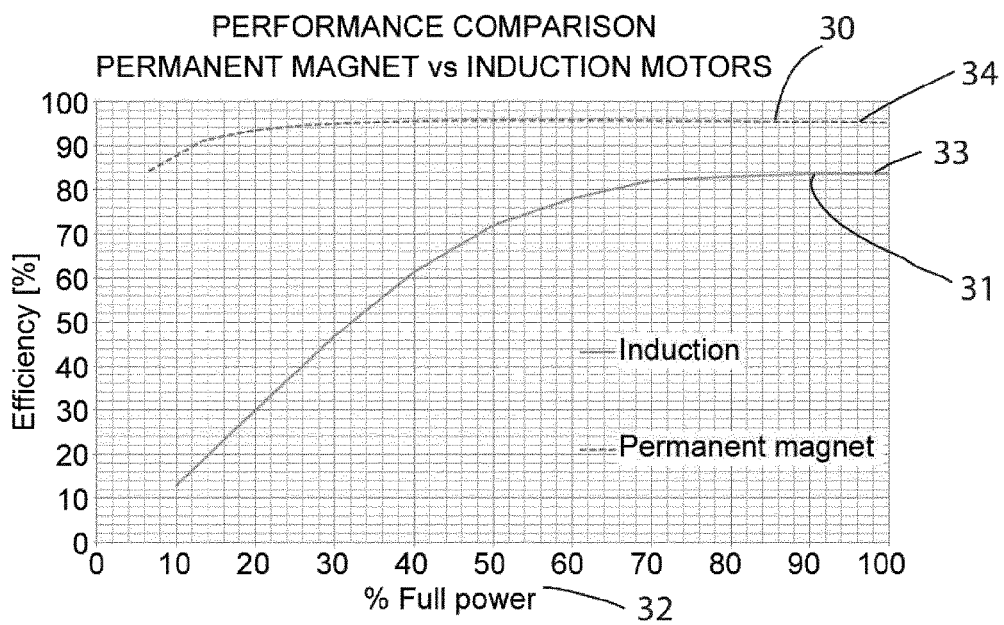
Figure 4:
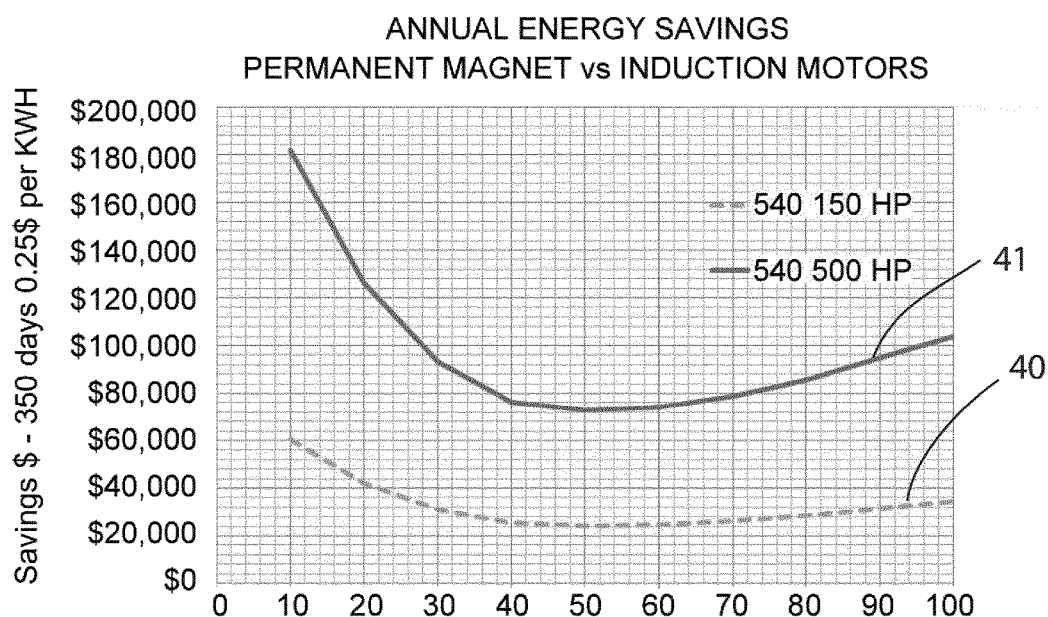

FIG. 2 is a graph showing the torque vs. rotational speed of both the induction and permanent magnet motor FIG. 3 is a graph showing the performance comparison of the induction motor vs. permanent magnet motor FIG. 4 is graph showing the annual energy savings of a permanent magnet motor vs. an induction motor for different percentages of full power of the motors Referring to FIG. 1 there is shown a tubing deployed electrical submersible pump system comprising an electrical submersible pump (ESP) system 1 is lowered into a well 2 on production tubing 3, and suspended in a tubing hanger 4 in a wellhead 5. A power cable 6 secured to the outside of the production tubing by bands or clamps 7, and is terminated at its lower end into motor body using a pot head 8. At the upper end the cable 6 passes through the tubing hanger 4 for example using a cable penetrator 9, a surface cable 10 then connects the penetrator to the surface drive 11.

The ESP 1 in this example has the pumps 12 connected directly to the production tubing 3, fluid is drawn into the lower pump via the pump inlet 13. The pumps 12 are connected to a protector 14, which performs three functions; it has a rotating seal to stop well bore fluids entering the oil system inside the motor, and it compensates for the expansion and contraction of the oil as the temperature changes, it also has thrust bearings to take the thrust load generated by the pumps. Connected to the protector are the two different motor types, the induction motor 15 and permanent magnet motor 16. Conveniently, the motors 15, 16 are secured beneath the protector 14; the order of the induction motor 15 and permanent magnet motor 16 is not important and may be reversed.

Referring to FIG. 2, the permanent magnet motor has a very flat torque curve 20 from zero speed to synchronous speed 21, while the induction rotor slips relative to the input frequency generating torque 22, and once it gets to synchronous speed 21 the relative frequency of the rotating field is zero, so the induced currents and voltages are also zero, and therefore the torque is zero. It follows that induction motors are only operated in the shaded area 23.

Referring to FIG. 3 there is shown a plot of the efficiency of both the permanent magnet motor 30 and the induction motor 31 against various percentages of full power 32. Even at its best the induction motor is not as efficient as the permanent magnet motor, typically achieving percentage values around the low 80's 33 while the permanent magnet motor can easily achieve percentage values of mid 90's 34. This can have a significant impact of energy used when changing the speed of the pump due to flow characteristics from the well.

Referring to FIG. 4 there is shown a plot of the annual energy savings of a permanent magnet motor vs. an induction motor of the same power again plotted against a percentage of full power and the dollar value saved based on 0.25$ per kWH One curve 40 compares two 150 HP motors, while a second 41 compares two 500 HP motors. The energy saving can be significant, in some locations such as Alaska the cost of electricity can be as high as 1.00 $ per kWH, where as if the well has access to commercially generated electricity the rate could be as low as 0.07 $ per kWH

The invention claimed is:

1. A downhole electric submersible pump, comprising at least one pump unit having a pump inlet, and an electric motor system to power the pump, the electric motor system comprising an induction motor and permanent magnet motor, the induction motor being capable of turning the permanent magnet motor until the permanent magnet motor can operate at synchronous speed.

2. A pump according to claim 1, wherein the induction motor and permanent magnet motor share a common power supply, connected in series.

3. A pump according to claim 1, the permanent magnet motor system being disposed in a first unit, and the induction motor being disposed in a second unit, the units being arranged in series.

4. A pump according to claim 1, wherein the pump is suspended on production tubing from a tubing hanger.

5. A pump according to claim 1, wherein the pump includes a motor protected disposed between the pump inlet and the electric motor system.

6. A rigless pump deployed and located in a well on coiled tubing or docked into a wet connector and comprising at least one pump unit having a pump inlet, and an electric motor system to power the pump, the electric motor system comprising an induction motor and permanent magnet motor, the induction motor being capable of turning the permanent magnet motor until the permanent magnet motor can operate at synchronous speed.

\* \* \* \* \*